United States Patent
Delano

(10) Patent No.: US 8,388,850 B2
(45) Date of Patent: Mar. 5, 2013

(54) SYSTEM AND METHOD OF WATER TREATMENT

(75) Inventor: Roger A. Delano, Sebastopol, CA (US)

(73) Assignee: Neos International, LLC, Los Angeles, CA (US)

( * ) Notice: Subject to any disclaimer, the term of this patent is extended or adjusted under 35 U.S.C. 154(b) by 711 days.

(21) Appl. No.: 12/384,369

(22) Filed: Apr. 3, 2009

(65) Prior Publication Data

US 2009/0250407 A1 Oct. 8, 2009

Related U.S. Application Data

(60) Provisional application No. 61/123,180, filed on Apr. 4, 2008.

(51) Int. Cl.
- *C02F 9/12* (2006.01)
- *C02F 1/78* (2006.01)
- *C02F 1/76* (2006.01)

(52) U.S. Cl. ......... 210/748.01; 422/21; 422/22; 422/24; 422/28; 422/186.3; 250/435; 250/437; 250/438; 250/493.1; 250/504 R; 210/748.11; 210/748.16; 210/202; 210/241; 210/198.1

(58) Field of Classification Search ............. 210/748.01, 210/749, 748.1, 748.11, 748.16, 758, 760, 210/764, 198.1, 202, 241; 422/22, 24, 27, 422/186, 21, 28, 186.3; 250/493.1, 494.1, 250/504 R, 435, 437, 438

See application file for complete search history.

(56) References Cited

U.S. PATENT DOCUMENTS

| | | | |
|---|---|---|---|
| 3,860,088 A | 1/1975 | Gellatly | |
| 3,924,139 A * | 12/1975 | Hirose et al. | 422/186.3 |
| 5,494,576 A | 2/1996 | Hoppe et al. | |
| 5,679,257 A * | 10/1997 | Coate et al. | 210/695 |
| 5,697,553 A | 12/1997 | Stotts | |
| 5,931,014 A | 8/1999 | Cole | |
| 5,944,138 A | 8/1999 | Vollmer et al. | |
| 6,027,642 A | 2/2000 | Prince et al. | |
| 6,030,526 A | 2/2000 | Porter | |
| 6,214,943 B1 * | 4/2001 | Newton et al. | 526/68 |
| 6,464,884 B1 | 10/2002 | Gadgil | |
| 6,602,425 B2 * | 8/2003 | Gadgil et al. | 210/744 |
| 6,616,839 B1 | 9/2003 | Peterson et al. | |
| 6,773,608 B1 * | 8/2004 | Hallett et al. | 210/748.11 |
| 6,773,609 B1 | 8/2004 | Hashizume | |
| 6,921,476 B2 | 7/2005 | Abe et al. | |
| 6,936,176 B1 | 8/2005 | Greene, III et al. | |

(Continued)

FOREIGN PATENT DOCUMENTS

CN 2005001360 * 1/2007

*Primary Examiner* — Joseph Drodge
*Assistant Examiner* — Cameron J Allen
(74) *Attorney, Agent, or Firm* — David L. Hoffman; Hoffman Patent Group

(57) ABSTRACT

A mobile water treatment system is disposed on a trailer of a truck. There is an intake filter, an intake hose, a pump or multiple pumps for water intake and sending water throughout the system, a filtering section that may include sand and/or bag filter or other types of filters, an ozone treatment section after the filters, a holding tank after the ozone section, a UV treatment section after the holding tank, and a chlorination tank. The water may then be sent to a water storage facility or other place as desired. The system includes a generator for power to run the system, and a controller for the system. The ozone section makes use of a misting nozzle in order to increase ozone contact time, and decrease ozone breakdown. The UV section makes use of a slightly downward tilted table with UV bulbs and reflectors above it, and preferably is mounted on a leveling system. A method of treating water uses the mobile system.

37 Claims, 12 Drawing Sheets

U.S. PATENT DOCUMENTS

| | | |
|---|---|---|
| 6,989,924 B1 * | 1/2006 | Jorgensen et al. ............ 359/361 |
| 2002/0139755 A1 * | 10/2002 | Green et al. .................. 210/748 |
| 2005/0218083 A1 | 10/2005 | Andrews |
| 2006/0054554 A1 | 3/2006 | Spears et al. |
| 2008/0067419 A1 | 3/2008 | Shih |
| 2010/0150793 A1 * | 6/2010 | Chan ......................... 422/186.3 |

* cited by examiner

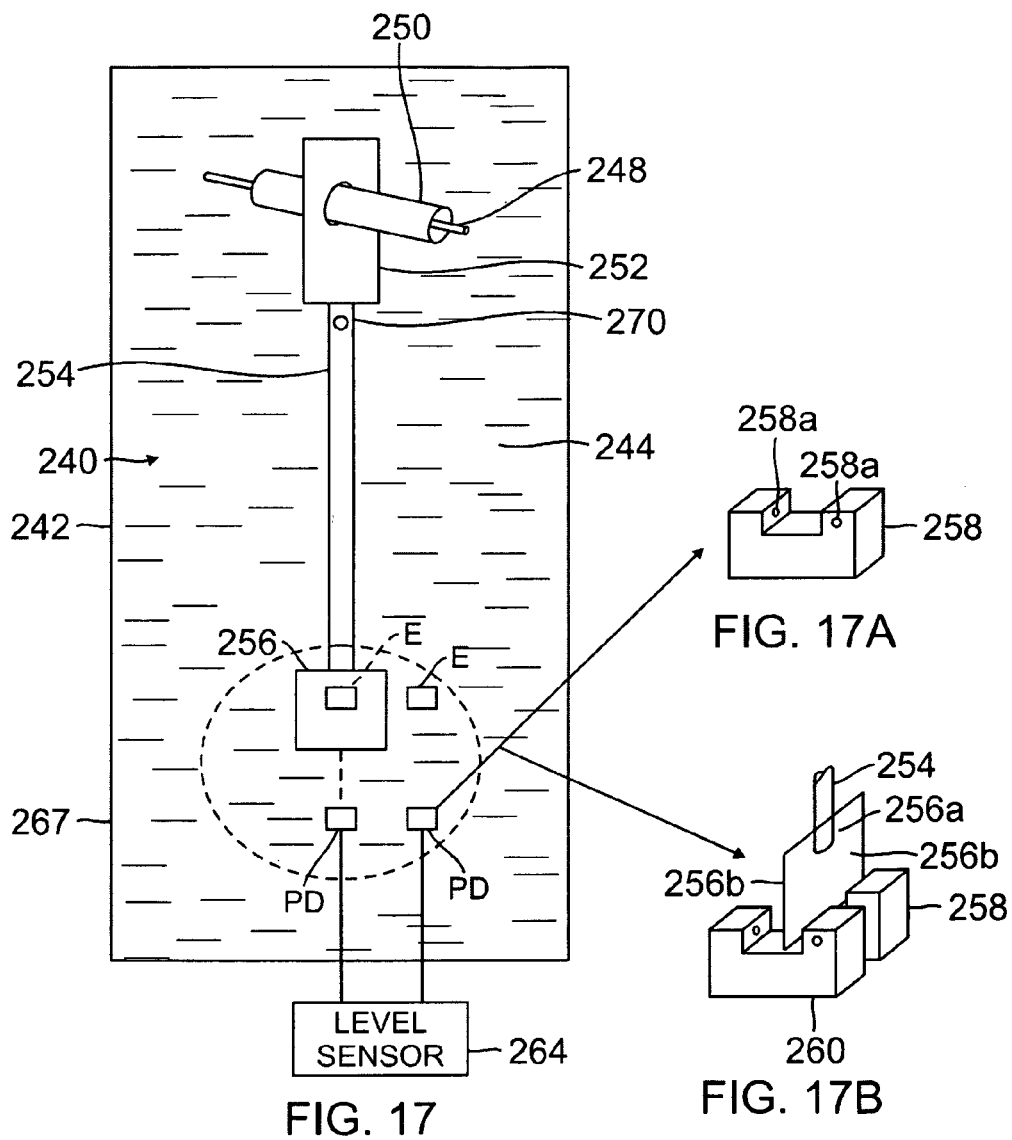
FIG. 17
FIG. 17A
FIG. 17B
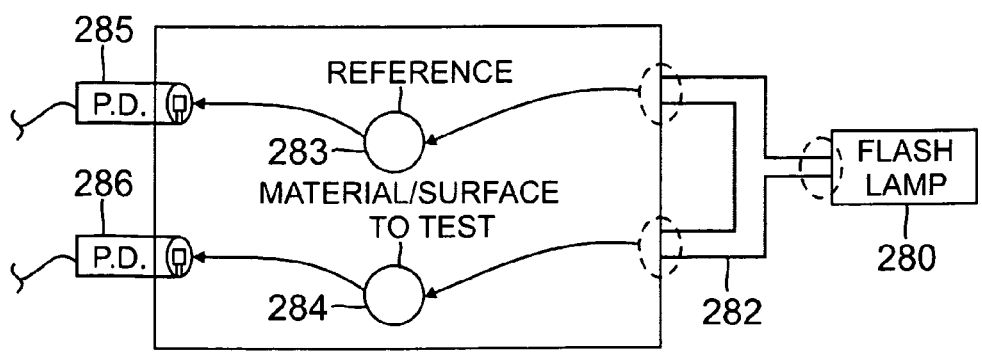
FIG. 18

SYSTEM AND METHOD OF WATER TREATMENT

CROSS REFERENCE TO RELATED APPLICATION(S)

This application claims priority from U.S. Provisional Patent Application Ser. No. 61/123,180 filed Apr. 4, 2008, and which is incorporated by reference herein.

BACKGROUND OF THE INVENTION

1. Field of the Invention

The present invention relates to a system of water treatment and purification and more specifically to a portable water treatment system.

2. Description of the Related Art

The system of generating ozone and injecting the ozone ($O_3$) into water for purification is commonly known. Current systems typically use a process of venturi mixing or porous materials to introduce small bubbles into the water. However, the process causes the ozone to break down into oxygen ($O_2$) so that the powerful oxidizing properties of ozone are negated.

Given the size and energy consumption, making a portable treatment unit would not be practical for thorough decontamination of water. For example, a portable ozone system such as the one shown by U.S. Pat. No. 7,118,678 to Porat does not appear to be sufficient for decontaminating water thoroughly for drinking or other high quality uses.

Other commonly used systems for water purification include UV irradiation. U.S. Pat. No. 9,494,576 to Hoppe et al. discloses a system that first injects water with ozone and then exposes the water to UV radiation. Hoppe et al's system does not appear to be portable.

Portable water treatment system such as the ones shown by U.S. Pat. No. 6,616,839 to Peterson et al. and U.S. Pat. No. 6,464,884 to Gadgil use filters, and Gadgil uses UV radiation too.

What is needed is a portable water treatment system capable of decontaminating water for drinking and other uses, using ozone injection. In conjunction with such need, various devices such as a simple and fast ozone meter would be necessary or useful to creating a practical portable system. In addition, an efficient and cost effective treatment system, with or without ozone treatment, depending on use is desired. The filters may also be varied and/or omitted depending upon conditions.

SUMMARY OF THE INVENTION

In one embodiment, there is a mobile water treatment system disposed on a trailer of a truck. There is an intake filter, an intake hose, a pump or multiple pumps for water intake and sending water throughout the system, a filtering section that may include sand and/or bag filter or other types of filters, an ozone treatment section after the filters, a holding tank after the ozone section, a UV treatment section after the holding tank, and a chlorination tank. The water may then be sent to a water storage facility or other place as desired.

A generator for power to run the system, and a controller for the system, are also provided in a preferred embodiment.

The ozone section makes use of a misting nozzle in order to maximize ozone transport to the water and minimize ozone breakdown.

The UV section makes use of a table with UV bulbs and reflectors above it, and preferably is mounted on a leveling system.

In various embodiments, certain parts and/or sections of the system may be changed or omitted. For example, the ozone section may be omitted, especially if water clarity and/or odor are not issues. The bag filters may be omitted.

The trailer is preferably a twenty five or twenty six foot long trailer, and about eight feet wide, and also about seven or eight feet tall.

In another preferred embodiment, there is a method of treating water using the system. The equipment is preferably modular, typically having a rate of 50 GPM per module. Each module can be added together for higher throughput. Some modules can be idled as capacity demands change over time.

The system can be mounted in fixed installations as well.

BRIEF DESCRIPTION OF THE DRAWINGS

FIG. 17 is a schematic view of a pendulum in accordance with a seventh aspect of the invention, which pendulum may be used in the leveling device/frame of FIGS. 15 and 16;

FIGS. 17A and 17B are enlarged perspective views of portions of the pendulum of FIG. 17;

FIG. 18 is a schematic view of a reflectivity meter for measuring reflectivity of a surface in accordance with an eighth aspect of the invention, the meter being useful for measuring reflectivity of various surfaces and structures to UV light for determining useful reflective surfaces for the UV light and reflector assembly in the UV tray assembly of FIGS. 12 and 14;

DESCRIPTION OF THE PREFERRED EMBODIMENT(S)

Figure 1:
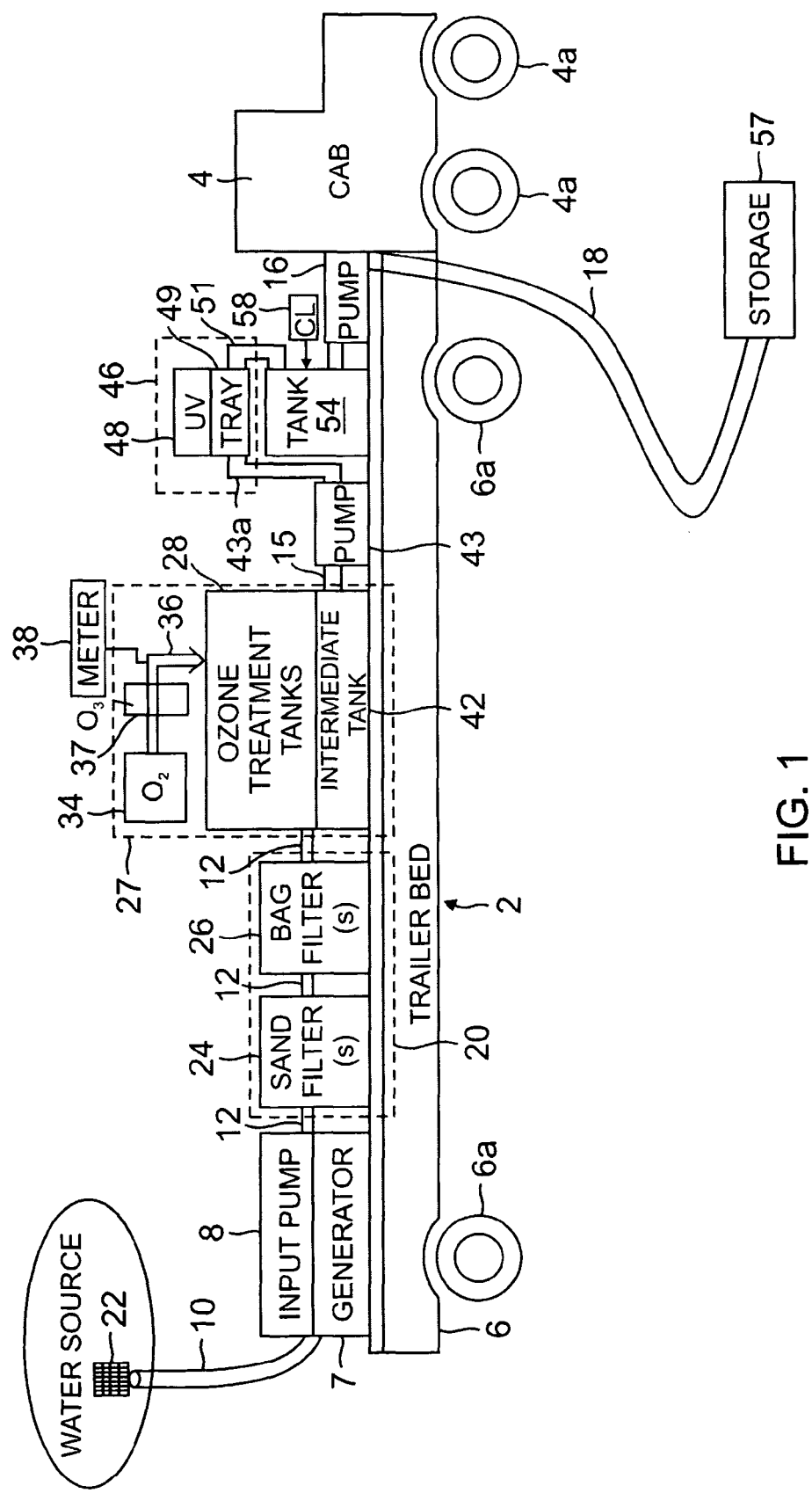
FIG. 1 is an overall schematic view of the mobile water purification system on a trailer in position at a water source, in accordance with a first aspect of the invention.
Figure 2:
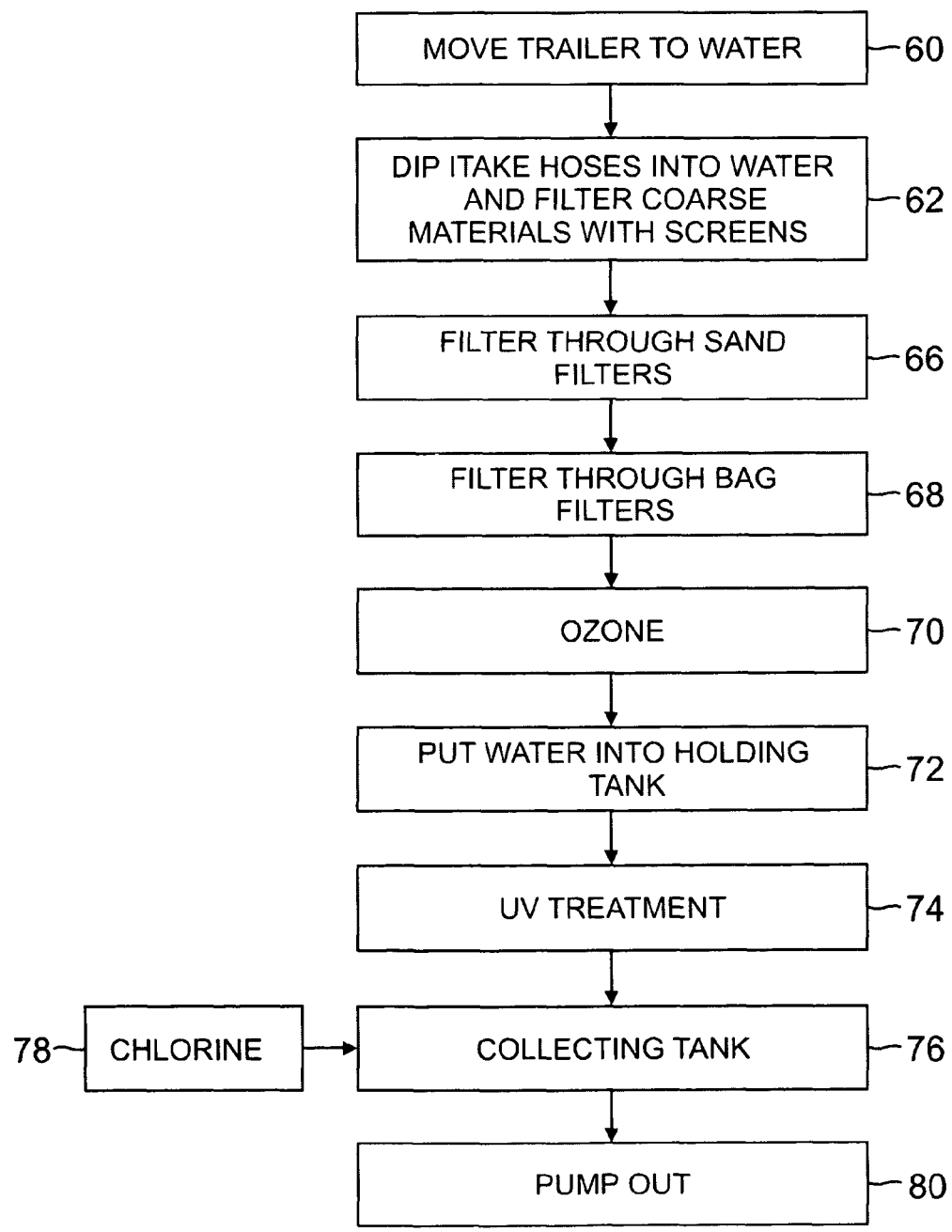
FIG. 2 is a flow chart of main steps in the process of water purification in accordance with a second aspect of the invention.

In one preferred embodiment, with reference to FIGS. 1 and 2, there is a system and method for treatment of contaminated water. The treatment system is one which may be modular, and which may be mounted on a trailer. The system can be fixed as well.

Water Treatment System

A mobile system 2 has a truck cab 4 having wheels 4a and a trailer bed 6 having wheels 6a. It could be mounted on a flatbed truck or in a shipping container, or can be fixed. Water treatment equipment is mounted on the trailer. The truck bed may be enclosed, and preferably has a footprint with a length of no more than about twenty five feet, and a width of no more than about seven feet, so that it may be housed within a conventional twenty five or twenty six foot trailer, preferably like a mobile home or mobile office style trailer. Such trailers are typically about eight feet wide and about seven to eight feet high. In the system as embodied, a flow rate of 100 gpm is achieved. However, depending on size and components, the system flow rate can be adjusted as desired.

Sufficient space for a technician or technicians to operate and check the system is expected to be present. The system can be scaled to a larger or smaller tractor.

The water treatment equipment preferably includes an input pump 8, intake hose or hoses 10 with coarse filter screen(s) 22 on the intake end, various conduits 12, 15 for carrying water to be treated through the water treatment equipment of the mobile system, an outlet pump 16, and an outlet hose 18 to storage 57, such as a water truck. The intake hoses 10 may be placed in a water source 11 of contaminated water. Alternatively, the source water may come from a supply line such as a contaminated well or municipal supply. If the source water is under pressure, the input pump is or may not be required. There is a filter section 20 having sand filter(s) 24 and bag filter(s) 26. After the filter section 20 is an ozone treatment section 27 having a tank or tanks where ozone ($O_3$) from an ozone generator 37 (receiving oxygen ($O_2$) from oxygen concentrator 34) passes through a conduit 36 and passes by an ozone meter 38, into ozone treatment tank 28 (or tanks). After the ozone treatment section 27 is an intermediate tank 42. Intermediate tank 42 may be positioned below the ozone treatment tank(s), so that gravity may be used to fill the intermediate tank, and thus conduit 15 would be one or more drainage conduits from the bottom of the ozone treatment tank to the top of the intermediate tank 42.

The tank provides contact time for the ozone to work.

Filters

The filters (sand and bag) may or may not be necessary or useful depending upon conditions.

Sand filters: A typical trailer has limited height and weight capacity. Therefore, there is or can be a practical restriction on equipment capacity. For example, an adequate sand filter set might have a diameter of forty to forty eight inches (40" to 48"), a height of eight or more feet (8'+), and weigh thousands of pounds. Moreover, it might be useful or necessary depending upon the application to have several sand filter sets.

To help avoid clogging of the bag filters, a bag filter design incorporating a layer that is intended to stop the particles that clog the fine stage of filtering. Alternately, one can install an intermediate filter ahead of the fine filter that would trap the "goo".

Non-surface Water Treatment

There are many applications where well water is contaminated with microorganisms, yet the water is clear in appearance. In such a case, the bag filters work very well.

Tank Sizing

The ozone contact tank and the chlorine tank sizes are not fixed. They only need be adequate for the job.

After tank 42 there is a UV treatment section 46, having a UV tray assembly with UV lights and reflectors 48 and a water tray 49 below the lights and reflectors. Then, there is a collecting tank 54, which collects water draining from the tray 49 via hose 51. There is also preferably a chlorine source 58 for chlorinating the water in tank 54. Outlet pump 16 selectively pumps water from tank 54 through outlet hose 18 into a storage 57 or holding tank such as on a water truck, or another receptacle or point of use, through an outlet hose 18. While one could return the treated water to the source 11, such as if one had no where else to put it, normally one would not do that.

Normally, the water is treated sufficiently to be potable or to be used for industrial or irrigation purposes.

A generator 7 may provide power for the system. Where an electrical power source is available, an extended power cord could be used. Also, an external generator (external to the trailer) may be used, if desired.

Method of Water Treatment

In accordance with a method of one embodiment of the invention, at step 60 the trailer 6 is moved to the water source 11. At step 62, an intake hose 10 are placed in the water with coarse filter screens 22 on the input end, and the water is pulled through the screens into the hose(s).

In the case where the water comes from a well or the water is "clear", the first screen is not necessary.

At steps 66 and 68, the water is further filtered. Preferably, this further filtering is by sand filters 24 at step 66, and then bag filters 26 at step 68. Any filter system can be used depending on conditions, and in some instances filtering may not be necessary, or filtering may use other types of filters.

Following filtering, at step 70 the water is mixed with ozone, preferably by misting the water in a tank which has ozone therein. At step 72, the water is drained from the ozone tank(s) and stored in an intermediate storage tank 42, e.g., 350 gallons. Such a tank is often referred to as a holding tank or clear well, and gives the ozone contact time with the water. In some instances, ozone treatment may not be necessary, and therefore the holding tank step may not be necessary, unless one wants to vary the flow rate using another pump for the UV treatment. At step 74, water from tank 42 is pumped to the UV treatment station where it is UV treated. At step 76, water is drained from the UV treatment station and goes into collecting tank 54. At step 78, water in tank 54 is treated with chlorine. At step 80, water in tank 54 is pumped out to water holding area.

The size of the holding tank is determined by the throughput rate. In our case we have two 50 gallon/minute sections or, 100 GPM total throughput. The tank capacity is 325 gallons, but we don't fill to the top. It comes up to about the 250 gallon mark before the pump turns on for the UV section. That gives the ozone a couple of minutes to do its job. Also, by making a mist we allow volatile compounds to come out of the water. These might be industrial chemicals or materials that have bad taste or odor.

Ozone Treatment

In accordance with another embodiment of the invention, there is an ozone treatment system and method that is unique. Details of a suitable ozone treatment station 27 for the system are shown in FIGS. 3 to 7. An oxygen ($O_2$) source 34 (e.g., oxygen concentrator(s)) supplies oxygen through conduit 34a to ozone generator ($O_3$) 37, and the resultant ozonated oxygen gets tested for ozone concentration at ozone meter 38 (FIG. 6). A typical amount of ozone concentration would be five to six percent, but more or less may be okay depending on other factors in the system. The ozonated oxygen passes through a conduit 36 into treatment tank 28, where it will be introduced to the water. Preferably, the ozonated oxygen enters the tank at or near the longitudinal center. Multiple input conduits entering at multiple locations could be used. In addition, adding or using a few percent (about 5 to 8%) of nitrogen appears to improve the efficiency of ozone production. Oxygen concentrators used to produce ozone leave a little bit of nitrogen in the product gas, and this can serve as the nitrogen introduction.

In tank 28, the ozonated oxygen is mixed with contaminated water, which has been filtered (previously by filter section 20). The filtered water passes from bag filter(s) 26 through conduits 12 into conduits 102 which connect to pipes 104. Pipes 104 preferably run laterally along tank 28, e.g., two pipes 104 per ozone treatment tank, positioned on opposite sides of the tank. (There may be two ozone treatment tanks, or more, as desired, and thus conduit 12 would be split in two.) At various intervals the pipes 104 pass to a nozzle assembly 108, which extends transversely into tank 28. In a preferred embodiment, there may be, e.g., a total of fifty nozzles mounted on each of the two pipes, totaling 100 nozzles 82.

A horizontal configuration of tank 28 is important to fit it in the trailer. In a fixed installation, a vertical chamber could work. An important feature is that in tank 28 a low velocity fog (atomized water) is created to mix with the ozone.

Figure 7:
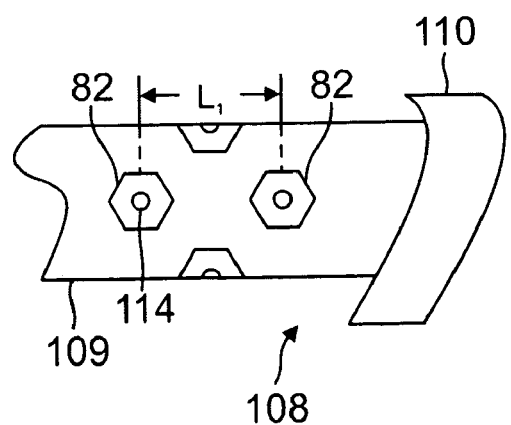
FIG. 7 is a view of multiple nozzles of the type of FIG. 3 on a pipe that is inserted into the spray tank at various points along the tank of FIG. 6.

Each nozzle assembly has a pipe or conduit 109 with multiple nozzles 82 mounted transversely thereto, each nozzle having a spray opening 114 facing into the tank and away from conduit 109 (FIG. 7). Conduit 109 has an end cap 110. Pressurized water flowing through conduits 104 (FIG. 6) enters each conduit 108 mounted thereto, and passes out of the spray nozzles 82, at opening 114.

The nozzles 82 may be positioned a distance $L_1$ apart, which may be, e.g., four inches. There should be multiple nozzles on each conduit 109, positioned all around the conduit, and each row of nozzles is preferably staggered from adjacent rows, as shown in FIG. 7. It is good idea to space the nozzles so that the droplets remain small to keep the fog streams from intersecting and forming larger droplets. Which decreases the surface to volume ratio of the water droplets.

The conduits 109 that extend into the tank 28 from the pipes 102 preferably would enter the tank at various angles to help scatter the mist and promote better mixing with ozonated oxygen. The nozzles are preferably at ninety degrees apart around the circumference of the conduits 109 and staggered by forty five degrees at the adjacent rings. For each nozzle, there is preferably a corresponding nozzle at 180° around the pipe.

In tank 28, the water mist mixes with the ozonated oxygen to treat the water. The mixing of ozone with a mist to treat the water achieves very fast and very effective ozone treatment of the water, in contrast to the treatment of water with ozone without misting the water. Merely mixing water and ozone as conventionally done limits the surface area of the water that can be exposed to the ozone.

Moreover, as the ozone is mixed with water in a conventional turbulent manner, the ozone partially breaks down before it can treat significant amounts of water. The energy applied to the ozone from the turbulent water in a conventional process causes the ozone molecule to return to its oxygen state because ozone is relatively unstable.

Misting Nozzle

Figure 3:
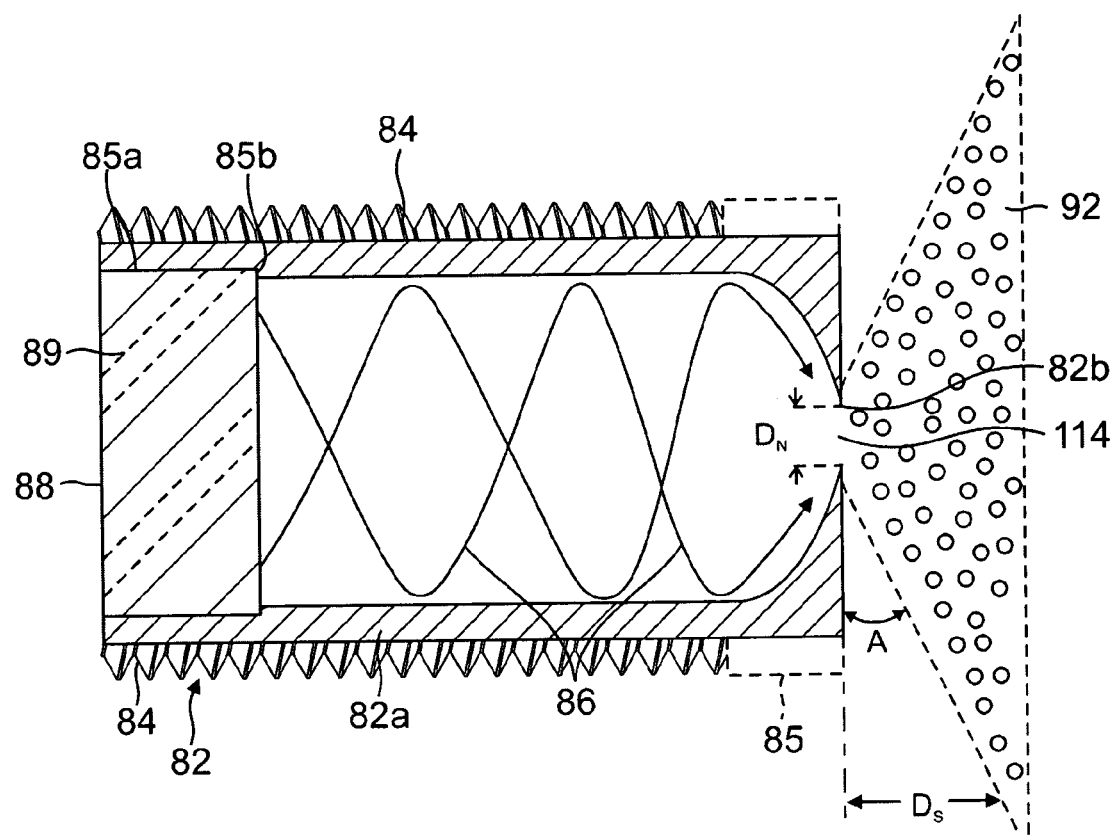
FIG. 3 is an enlarged sectional view of a spray nozzle with insert, showing a spray, in accordance with a third aspect of the invention.

Details of the nozzle 82 in accordance with an aspect of the invention are shown in FIG. 3. Nozzle 82 has a body 82a, preferably of Stainless Steel or brass (e.g., 360 brass) because it is relatively easy to machine, but other metals, plastic, ceramic, and/or other typical nozzle materials could be used. Stainless steel would be the best metal. The nozzle body 82a has external threads 84 which may be used to fit into the conduit, or thread to a hose. The body 82a may also have a hexagonal portion 85 for gripping and/or using a wrench. The nozzle has a spray hole 114 which is preferably defined by a small opening diameter $D_N$, and an edge 82b, which is preferably relatively thin knife-like edge. For example, $D_N$ may be on the order of hundredths of an inch or smaller, e.g., 52 thousandths. The thickness of edge 82b at the nozzle opening may be even smaller, e.g., 10 to 12 thousandths. However, while the knife-edge is preferred, the spray opening need not be formed that way, and could simply be a drilled hole, particularly since a knife-edge would be expensive to produce. The length of the bore should be as small as possible to maintain the cyclonic motion, e.g., about 0.008" to 0.014". In the testing described below, the nozzle's bore length was 0.010" to 0.012".

Figure 4:
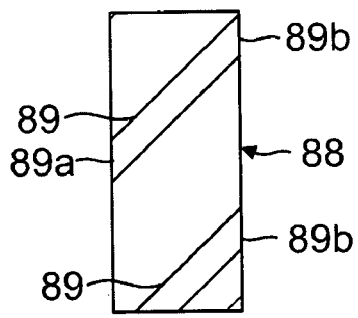
FIG. 4 is a side view of the insert showing the channels.
Figure 5:
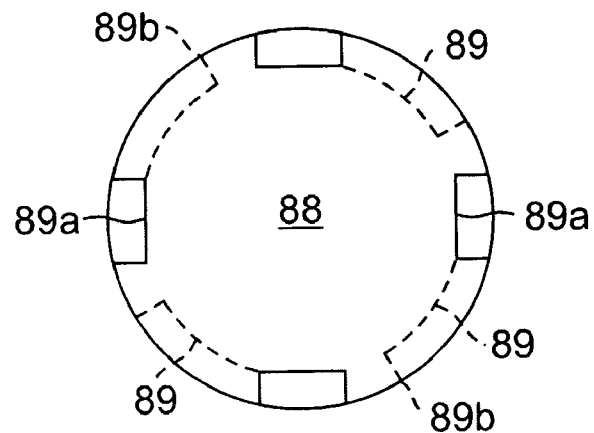
FIG. 5 is a view of one face of the insert showing one end of the channels, and showing the channels in phantom.
Figure 6:
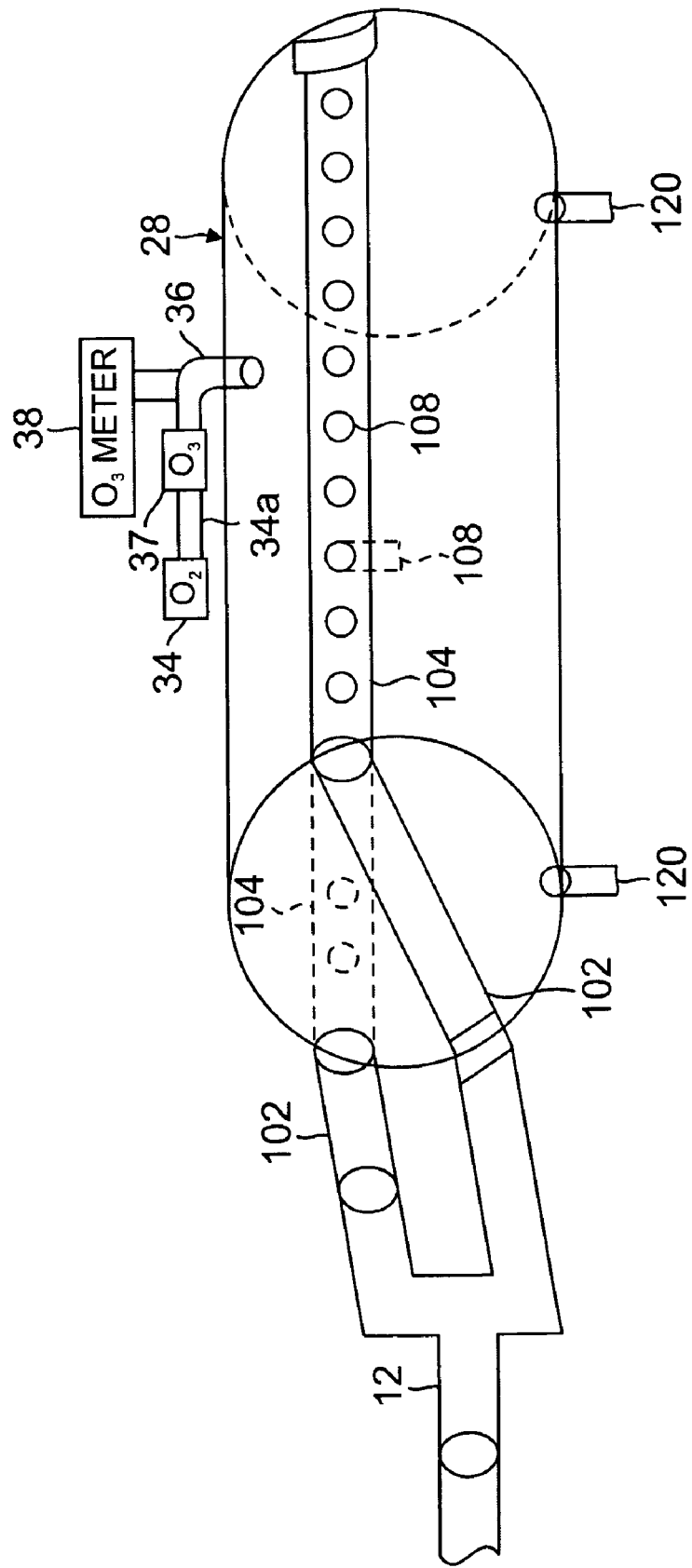
FIG. 6 is a schematic view of a suitable spray tank for the system of FIG. 1.

A round, solid insert 88 fits within nozzle body 82a, and has channels or slots 89, preferably diagonally formed in the insert's outer periphery, as best shown in FIGS. 4 and 5. An input end 89a and an output end 89b of each slot 89 are thus open to respective faces of the insert 88.

A single channel or drilled hole that causes the water to swirl or any other way to achieve swirling water in the nozzle body will work. The hole could be located in the side of the body, where the threads are.

The insert preferably is located at the input end of the nozzle, and the nozzle body 82a may have a recess 85a and a shoulder 85b to locate the insert which may be press fit therein. Water 86 passing into nozzle 82 passes through the channels 89 and is forced to swirl around the inside of the nozzle body and be directed out the nozzle opening 114 by curved inner walls of the nozzle body. Instead of channels, grooves, angular holes, tangential grooves or holes, or individual or combinations of these channels, grooves, holes and the like may be used to swirl the water. This swirling action, and especially where combined with the relatively small opening and knife-edge 82b of the nozzle, creates a very wide dispersion, e.g., at angle A to the nozzle face, where A is relatively small so the dispersion angle is large. A very fine mist of water droplets 92 is achieved. The mist has very little projection beyond the exit, essentially all of its velocity being exhausted quickly in a short distance $D_S$, e.g., about four inches. The channel width for the channels 89 may be as desired to obtain the desired throughput.

Although nozzles can vary widely in dimensions and input, water pressure, and insert structure to achieve a fine mist, one example is providing a nozzle pressure of about 100 psi, and an output of about one half gallon per minute. Using the dimensions of the nozzle, the input water can almost reach sonic speeds in the nozzle.

The tank may be made of plastic, or other suitable material, and bars for supporting the conduits and nozzle assemblies may be fixed to the outside of the tank. The conduits may be inside the tank but preferably are outside, and the nozzle assemblies penetrate the tank. There may be hundreds of nozzles, e.g., 100 or 200.

Due to the nozzle geometry, in spite of the very high speed of flow through the channel in the insert due to going from a flow with significantly larger cross sectional area of the nozzle body might at the exit the resultant mist is relatively low velocity at very short distance from the nozzle.

Therefore, the inertia of each droplet is very small, and thus will not cause any significant or fast drop in the ozone concentration, before ozone can otherwise contact the droplets. The velocity of the tiny droplets rapidly slows after they exit the nozzle. Thus, they allow for gentle transfer of the ozone to the water. In addition, the walls of the surrounding vessel are coated with sheets of gently falling water. This also provides a surface by which the ozone may enter the water.

There are several variables that can be or may be changed yet still achieve a relatively fine mist at low velocity, and/or acceptable treatment, e.g., water input pressure, flow rate, nozzle geometry, insert geometry, the number of nozzles per volume of the tank, tank size and geometry, ozone concentration, the number of ozone inlets to the tank, and potentially environmental factors, such as tank temperature.

While the inventive way of misting water for use for contacting water with ozone is preferred, such a nozzle need not necessarily be limited in use for misting water for ozone treatment. For example, such a nozzle may be useful in snow-making, e.g., to create a fine mist that would freeze quickly because of its relatively great surface area and wide dispersion of water at low velocity.

It should be noted that the fittings and tanks and other devices that come in contact with ozone, as would be well known to one of ordinary skill in the art, should be resistant to ozone. For example, tubes and fittings may be made with Kynar® which is resistant to ozone. Kynar® is Polyvinylidene Fluoride, or PVDF which is a highly non-reactive and pure thermoplastic fluoropolymer. It is also known as HYLAR or SYGEF.

Ozone Meter

Figure 8:
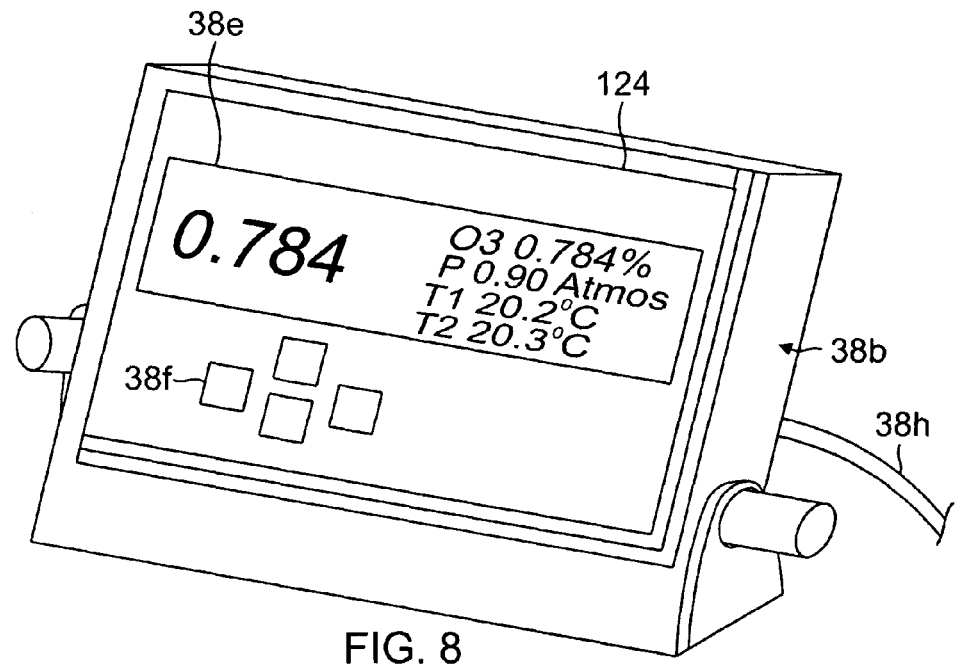
FIG. 8 is a perspective view of an ozone meter of a type in accordance with a fourth aspect of the invention, which may be used in the system of FIG. 1.
Figure 9:
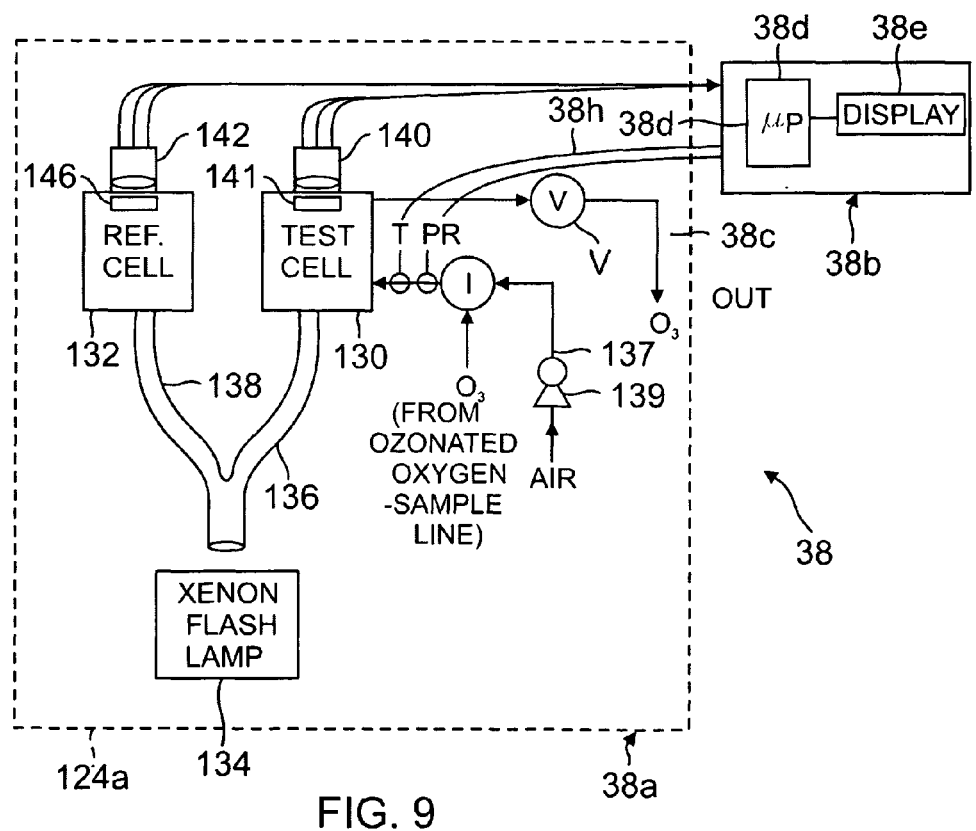
FIG. 9 is a schematic view of the ozone meter of FIG. 8.

FIGS. 8 and 9 show an ozone meter in accordance with another aspect of the invention. The meter 38 is of a type that may be used in the system of FIG. 1. Meter 38 is preferably in two parts. A housing 124 holds a display 38e, and a microprocessor 38d. There may also be buttons 38f to turn on and of the meter, and/or to control the display. There may also be a battery or other power source. The display could be incorporated in the measurement box. The displays can be daisy-chained or linked wirelessly.

Where the meter 38 is in two parts, a cable 38h such as a CAT 5 cable receives inputs from a sensor portion 38a of the meter. The sensor portion 38a is shown in FIG. 9 in a box or housing 124a, such as a plastic weatherproof electrical box. Inside the box is a pressure sensor Pr for measuring pressure of the ozonated oxygen. (It could be any gas plus ozone, e.g., oxygen with some nitrogen. As a stand alone monitor, it could be any gas mix that does not absorb 254 nm UV light.) as it enters the box. The pressure reading is then passed to the microprocessor via wires and cable 38h. The temperature of the gas is measured too. Both are needed to calculate the ozone concentration.

Alternatively, a local microprocessor may be inside housing 124a, and send signals to the display portion 38b of the sensor. (The entire meter could be housed in one box, but two are preferred so that the display can be positioned remote from the sensor portion.)

The ozone testing apparatus and method in accordance with this aspect of the invention includes two cells, an ozone path test cell 130 and a control path (reference) cell 132. The ozonated gas passes into cell 130 (taken from a sample tap of the ozonated oxygen line, and out in a conduit 38c. Input valve I and output valve V may be provided. A pump 139 for purging the sample cell with air may be used when the apparatus is zeroed.

The control path or reference cell 132 is empty, e.g., it may have a control gas of oxygen without ozone provided to it (or ambient air but whatever is provided to the reference cell should preferably be used to flush the test cell). Air is used so that the optical absorption of the purge gas and the reference cell contents are the same.

A light source 134, such as a xenon flash lamp, sends out pulses of light through a bifurcated fiber optic cable 136, 138 to one end of each cell 130, 132. At the other end of each cell are photo detectors 140, 142 (with capacitors) and filters 141, 146. The band pass filters eliminate wavelengths that are not of interest.

Because ozone absorbs light of wavelength in the region of 254 nanometers (k=254 nm), this wavelength will not fully pass through to the filter 141 to photo detector 140 in comparison to the intensity of that wavelength passing through cell 132 to filter 145 and photo detector 142. As would be well known to one of ordinary skill in the art, the Beers-Lambert Equation may be used to determine the ozone concentration in cell 130, based on the relative readings of photo detectors 140, 142. The filters 144, 146 are preferably set to pass only wavelengths of 254 nm plus or minus about 10 nm, for example. The light source 134 may be solely UV, or it may be a larger spectrum of light. The filters could be placed at the source (light input) end of the cells or at the output of the flash lamp/source 134. (Filters can be placed anywhere in the optical train. Also, the fiber-optic may be replaced with lenses and a beam splitter or pellicle. All optical elements must transmit the UV wave length of interest. Typically quartz is used.) The microprocessor measures the charge on each capacitor of the photo detector, and uses the ratio to calculate absorption, and from the level of absorption, determines ozone concentration.

The temperature of the input gas to cell 130 (T1) and the temperature of input gas to measurement cell 132 (T2) are also measured and sent to the microprocessor.

In the testing process, the flash lamp is turned on initially with both tubes having nothing (air) for self-calibration. Then, the ozonated oxygen is passed into cell 130 and the display provides a read out, virtually instantly. A standard commercial system typically uses a single continuous wave UV bulb. That bulb has to take time to warm up. In using a strobe/flash lamp, the lamp turns on immediately. The intensity of the flash is measured relative to the sample path with each measurement sequence.

This meter provides essentially instant on, self-calibration, self-flashing, and is accurate and relatively low power.

The meter or the sensor portion can be daisy-chained together to provide multiple sensors, e.g., six. The microprocessor can also be used to log the data by storing it at desired intervals, so the data can be reviewed. An alarm may be included in case ozone concentration falls outside a predetermined range.

The meter may simply have one on button or switch, and buttons 38f may also allow scrolling to view the historical (logged) data.

Units of measurement and any measurement interval (e.g. every 10 minutes or every hour) can be varied. This extends the lamp life and the frequency of data logging.

Ozone Treatment Prior to UV Treatment

In accordance with another aspect of the invention, in the system and process of treating the water, the water is treated with ozone before UV treatment. The ozone decreases the absorption of the UV light by the water. Therefore, treatment with ozone prior to UV treatment is preferred. A most effective UV wave length for killing bacteria and pathogens, and the like in the water is 254 nm. It is noted that UV destroys ozone, so the UV and ozone treatments preferably do not occur at the same time.

UV Reflector Assembly

In accordance with another aspect of the invention, a preferred UV source is to use a UV producing bulb at 320 watts total power dissipation, which produces about 30% of the UV output at 254 nm.

UV bulbs typically are in a quartz tube because the quartz transmits the UV light. The tubes typically are operated between 200° F. to 260° F. during operation. (Quartz has very low thermal expansion. Therefore, water drops probably would not cause any damage other than to cause spots that would block light and might eventually lead to de-vitrification.) In the conventional jacketed UV treatment units, the quartz tubes are further encased in a jacket, because if the water contacted the tube, it would run cold and would not generate the wavelength of interest. Conventional UV treatment systems use a pipe with the tubes inside. Water passes through the pipe and around the tubes. The outer jacket surface tends to grow algae, which as noted above, thrives with UV light. In addition, reflections at the surfaces of the jacket reduce the amount of available UV light. Accordingly, a benefit of the preferred embodiment is the lack of a jacket.

In the past, the water to be treated is sent along a pipe containing the quartz tubes encased in their outer tubes. The preferred pipe has been stainless steel for its reflectivity, and its rust resistance. However, the inventor has found that stainless steel is a very poor reflector of 254 nm, and algae may tend to grow on the steel surface too.

It takes about 400,000 microwatt seconds/sq.cm. to kill blue green algae. The preferred embodiment applies about one million microwatt seconds of UV light to the water, by using UV light directed (and reflected) toward water flowing past, but not in contact with, the UV bulb. Preferably, the source is an extended source. With the spacing and reflectors, the light intensity is relatively constant within the volume of the water.

A reflector material in accordance with this aspect of the invention provides high reflectivity, especially of 254 nm UV light.

Preferably, a reflective layer is provided on a substrate. Aluminum is preferably provided on each side of a Mylar® substrate (Mylar® is a thin polyester film or plastic sheet made by Dupont Teijin Films U.S., in Hopewell, Va., such as the thin reflective sheet like that used for helium balloons).

Figure 11:
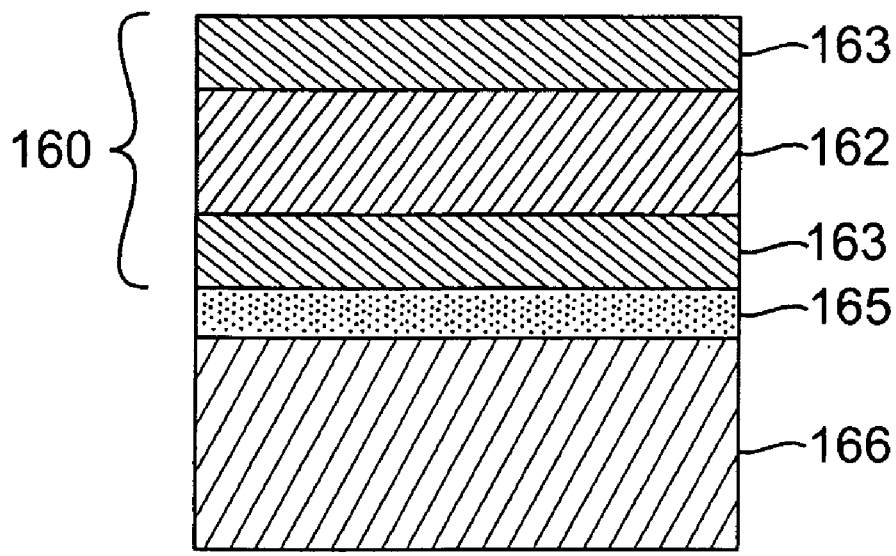
FIG. 11 is an enlarged sectional view taken along sectional lines of FIG. 10, showing a composite structure for the UV reflector of FIG. 10.

As shown in FIG. 11, the reflective material 160 is a commercially available metalized Mylar® sheet. Such a sheet has, e.g., aluminum, e.g., 700 Å (700 angstroms) thick, on each side of substrate 162, e.g., Mylar®, e.g., three mils (3 mils) thick. Bonding layers 163 or bonding interfaces are between the Mylar® and aluminum. The aluminum is actually coated onto the Mylar®, so layers 163 would represent the interface.

The aluminum and Mylar® composite provides a very high reflectivity, especially for UV light and especially at 254 nm. Such a sheet is commercially available.

This metalized Mylar® sheet is placed on a further substrate 166 and bonded to the substrate 166 by glue 165 or a transfer adhesive tape. Other adhesive systems could be used, including pre-coating the aluminized Mylar®. To avoid air bubbles, pin holes are placed in the sheet the sheet is rolled against the substrate 166, but the sheet could be pre-punched and could be applied using another technique such as laminating rolls.

Figure 10:
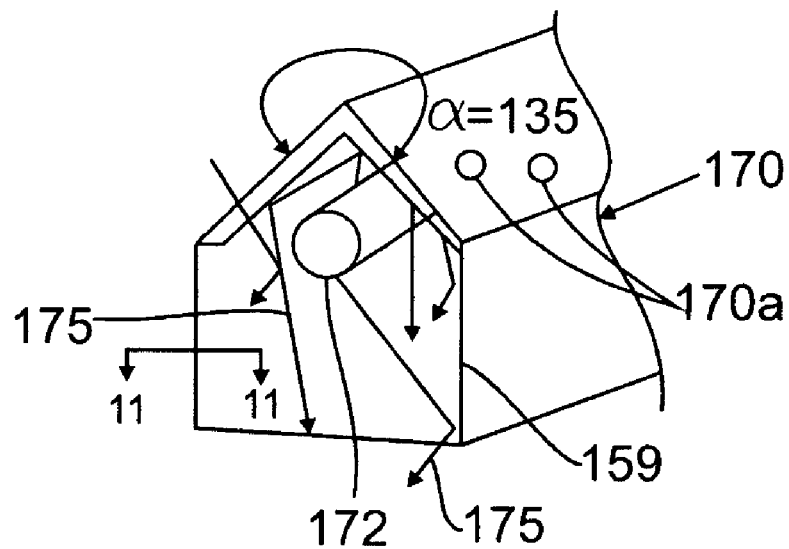
FIG. 10 is a UV bulb and reflector for a UV tray assembly in accordance with a fifth aspect of the invention, which may be used in the system of FIG. 1.

The substrate 166 is preferably thicker, e.g., 14 thousandths of an inch of e.g., aluminum. Silver or copper, or other further substrate material may be used, but aluminum is preferred due to its light weight, formability and heat conductive ability. The further substrate should be relatively light weight, and a good heat conductor to help dissipate heat from the UV bulb which will be inside the reflector material 159 when the reflector material 159 is formed into a reflector 170 as shown in FIG. 10. It should also be malleable or formable, so that it may be bent into a reflector shape as described below. Each reflector 170 is preferably adjacent the next, and held together, e.g., by stapling. The reflectors could be formed from one long sheet.

To fix the metalized Mylar® to the aluminum substrate, one should apply a very even layer of glue, such as by using a glue applied by transfer tape (e.g., as made by 3M).

A bending jig or a press brake may be used to form the reflector material 159 into the cross sectional (house) shape shown in FIG. 10, which shows reflector 170 and UV bulb forming a reflector and bulb assembly. The preferred shape for the reflector has a 135 degree angle ($\alpha=135°$) at the top, e.g., plus or minus about fifteen degrees (15°). The bulb preferably sits in the angled section. The reflector 170 is made to reflect UV rays 175 downward in a concentrated manner.

The reflector can get very hot, so vent holes 170a and fans 178 should preferably be provided to help dissipate heat. Note that the holes 170a are preferably placed at the peak of the reflector housing, which helps dissipate heat and avoids loss of usable UV light.

In making the reflective material, the transfer tape is an acrylic transfer tape that has a high temperature resistant glue, such as VHB (very high bond strength.) There is no substrate for the adhesive. All that transfers is the glue. In addition, a silicone coating using, e.g., silicone 151 (from Master Bond Inc. at www.masterbond.com) may be dispersed in mineral spirits (with a 100° F. (high) flash point) to dilute the silicone, is used to protect the aluminum on the metalized Mylar® surface that is exposed on the interior of the reflector, since it is so thin (e.g., 700 Å).

UV Tray Assembly

Figures 12, 13:
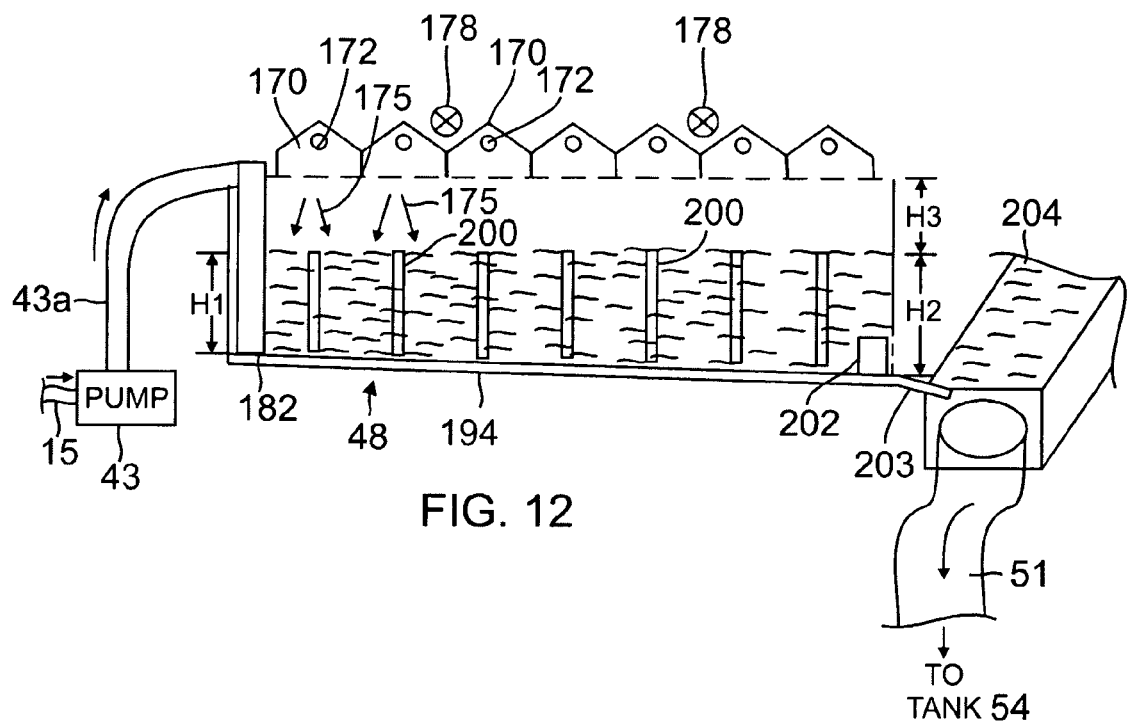
FIG. 12 is a schematic view of the UV tray assembly.
FIG. 13 is a view of a main face of one of several elongate flow control gates in the UV tray assembly of FIG. 12.
Figure 14:
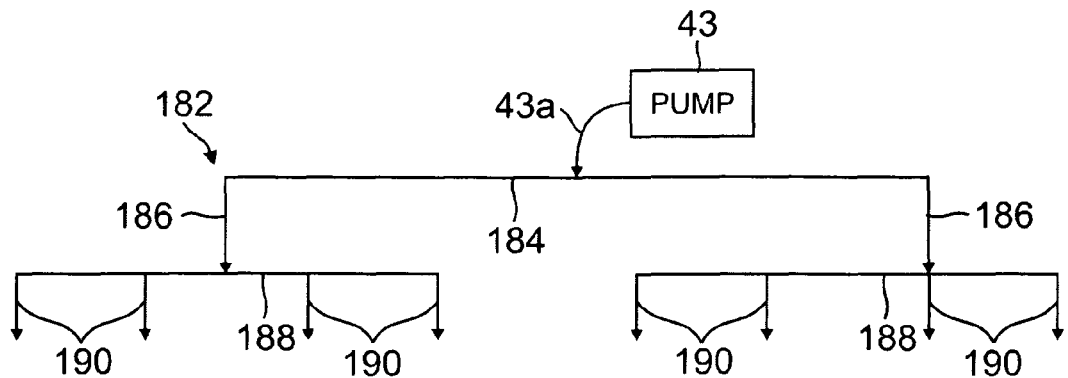
FIG. 14 is a schematic view of a network of inlet pipes for water into the UV tray assembly of FIG. 12.

In accordance with another aspect of the invention, UV tray assembly 48 of FIG. 1 is shown in more detail in FIGS. 12 to 14. The elongate reflector and UV bulb assemblies 170, 172 are positioned at intervals above a tray for carrying the water to be treated. The water is pumped from intermediate tank 42 through another conduit 15 by pump 43. Instead of a pump, gravity may be used if the intermediate tank is higher than tray 194. The water passes through a conduit 43*a* into a water delivery network of pipes 182, shown schematically from the side in FIG. 12, and shown schematically from the front in FIG. 14.

The delivery network has a long horizontal pipe 184, two first down pipes 186, then two second horizontal pipes 186, which each may have four second down pipes 190. Preferably, there are a total of eight delivery openings for each tray. The inlet pipe feeds a tee that branches left and right. Each branch feeds four delivery pipes for the total of eight.)

This network of pipes delivers the water relatively gently and distributes it across the front of a tray 194. The tray 194 is relatively shallow, e.g., a height of water $H_1$ at the front (input is about one to one and one half inches but can be any desired amount) and at the output end a height of water $H_2$ is about one to one and a half inches too, but $H_2$ is likely to be and would be slightly lower than whatever height $H_1$ because the input water is flowing in at that point. (The water height is different because of the restriction of the flow control baffles and the weir just ahead of the out-fall.) The energy of the input flow, and the constraints of the sides of the tray, causes the water to flow through the tray. Therefore, the tray and the surface on which it rests should be level. The bottom of the tray is preferably flat.

In an exemplary embodiment, the UV bulbs and reflectors are five feet (5') long and the tray therefore is five feet wide, and the tray is about twenty eight and one half inches (28½") long. Preferably, twelve tubes are used on each tray. They are 3" apart plus room for the water delivery system. So, the tray is roughly 42" long. The width of the tray is slightly less than the quartz portion of the tube. The reason for this is that very little UV is generated at the ends.) In the preferred embodiment, transit time is 10 to 12 seconds.

To help subject all the water in the tray to UV light substantially equally, and help achieve the desired residence time in the tray, centered below each bulb there preferably is a flow disruptor 200 which is a thin perforated plate, extending the entire (five foot) width of the tray, or a little less in order to allow for clearance. The perforations create turbulent flow, and also help the residence time of the water below the strongest part of the UV light. The tray and the plates can be galvanized aluminum or other suitable materials. The percentage of open area in the disruptors and hole size can vary greatly depending on desired residence time and turbulence.

In the experimental system as discussed below, the measured UV at 254 is 0.08 watts/sq.cm. The transit time is twelve seconds. That gives a UV dose of about 1,000,000 micro-watt·sec./sq.cm.) Note that one need not provide wipers to remove algae from the bulbs, because the bulbs are no longer submerged in the water being treated. Instead, they are positioned one to two inches above the water's surface. (The tray is level. At the out-fall, there is a ½" high weir in order to keep the depth correct.) Given the preferred level surface for the tray, it is important to ensure a level surface supporting the tray. A suitable leveling system is discussed below.

At the output end of the tray, there may be a weir 202, a slightly bent deflection/anti-drip overhang 203, and a collection trough 204. In order to control the water as it leaves the tray, a cut liner extending about ¼" past the edge of the tray is used. The weight of the water deflects the liner downward. That forms a smooth stream that does not leak back under the tray. Alternatively, the tray could have downward bent lip to do the same thing. But, the second option is much more work to fabricate. The height of the weir may be used to control the height of the water in the tray. Collection trough 204 would be at least five feet long for a five foot wide tray, and would be slightly tilted from the ends toward the center, and have a hole and conduit 51 at the output end. A gutter that collects the out-fall is "V" shaped so that slope is toward the center with the down spout located there.

While another pump could be used to pump water to a collecting tank, preferably gravity is used so the tray is positioned at a height above the top of the collecting tank 54. Chlorine 58 as shown in FIG. 1 may be mixed into the water in the collecting tank 54.

The perforated plates 200 not only help equalize the closeness of the water to the lamps, but also help equalize the velocity gradient in the flow, i.e., without the flow controllers water remote from (the tray) surface flows faster than water adjacent a surface. Thus, not all of the water would receive the same UV exposure. The perforated metal plates 200 are preferably about 50% open, but various amounts such as 35 to 70% open or more or less may be used. The shape of the holes may also vary. The plate is typically thirty thousandths thick. An insert screen will also work.

One may also place a screen above the water where it enters the tray, adjacent the input network 182 or in the water, to help avoid splattering, as it is important to keep the water away from the UV bulbs. The bottom of the tray is preferably lined with Mylar® or other reflective material, or the Mylar® aluminum composite mentioned above, to help reflect more UV rays up through the water.

Levelling System

Figure 15:
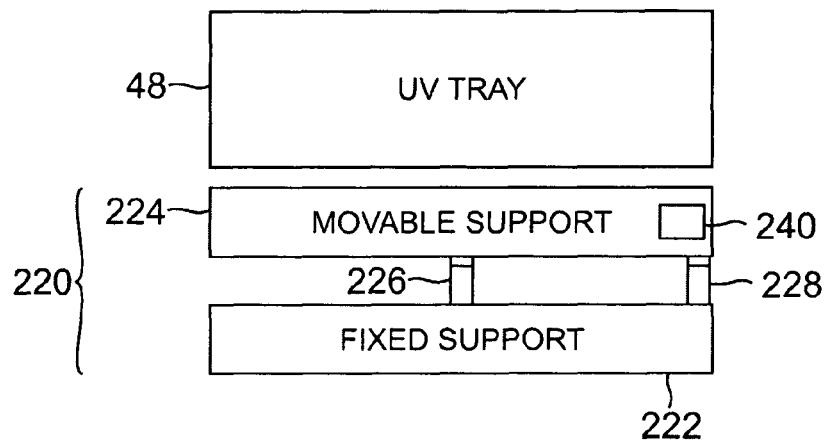
FIG. 15 is a schematic side view of the UV tray assembly of FIG. 12 mounted on a leveling device/frame, in accordance with a sixth aspect of the invention.
Figure 16:
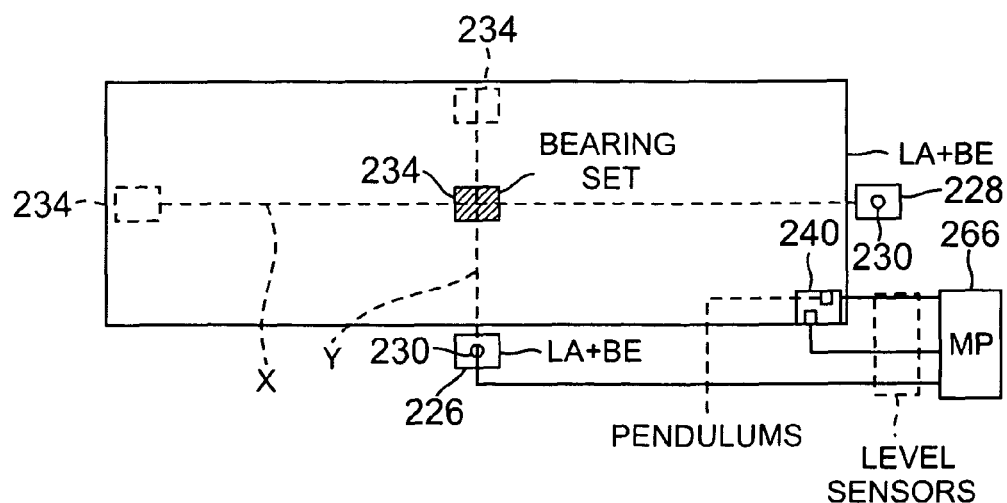
FIG. 16 is a schematic top view of the movable support of the leveling device/frame also showing the positioning of two linear actuators (LA), fixed at their lower ends to the fixed support, and having bearing ends (BE) at which their tops connect to and support the movable support of the leveling device/frame, and a bearing set located on axis with each of the bearing ends for supporting the movable support yet allowing rotation of the movable support about X and Y axes, and showing positioning of two pendulums for a leveling sensors and controller for the linear actuators.
Figure 16A:
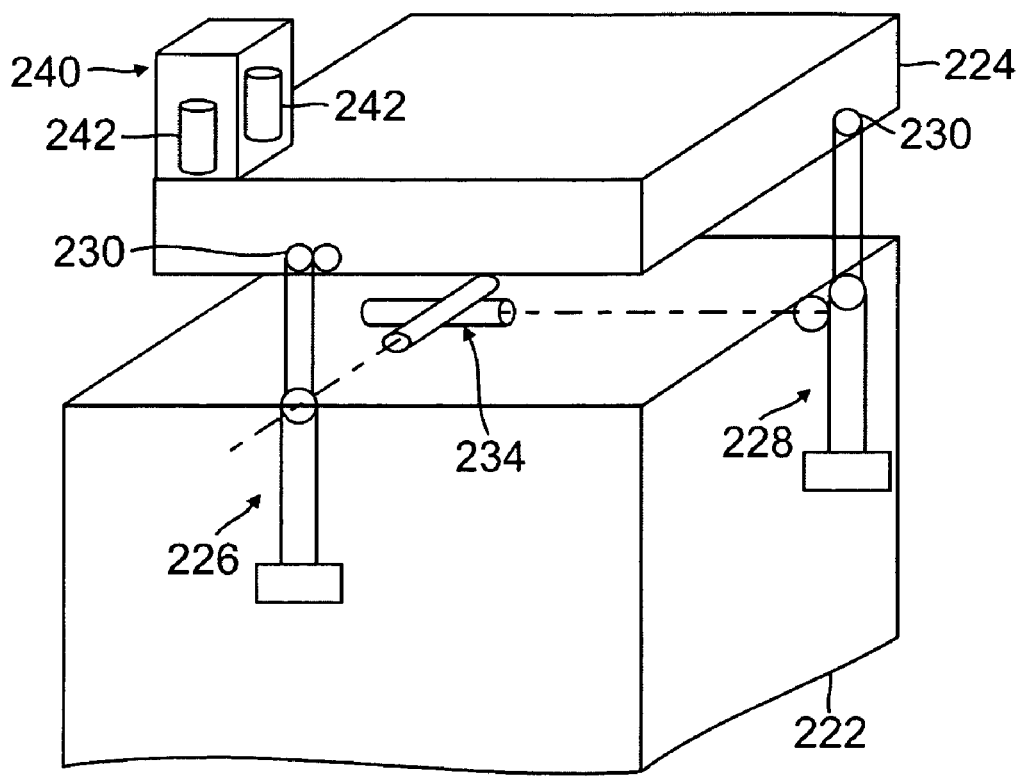
FIG. 16A is a schematic view of the leveling system.

In accordance with another aspect of the invention, in FIGS. 15, 16 and 16A, UV tray assembly 48 is mounted on a leveling support 220. Support 220 has a fixed support 222 such as a wooden or metal frame, e.g., with a truss-like structure, and a movable support 224 also having a wooden or metal frame, e.g., with a truss-like structure.

In the leveling mechanism, there are two linear actuators (LA) 226, 228, and their positioning is best shown in the plan view of FIG. 16 and also in FIG. 16A. The lower ends of the actuators are fixed to the fixed support 222 preferably gimbaled, e.g., with a swivel rod end, and the upper ends of the linear actuators are gimbaled to the movable support using, e.g., a ball in a cup, forming a swivel rod end (BE) 230.

A bearing set 234 vertically supporting the movable support is located on the intersection of X and Y axes extending across the movable support in line with the swivel rod ends 230 of each linear actuator 226, 228. (Additional bearing sets may be placed along the axes to further support the movable support. The bearing sets may be three pillow bearings, one fixed to the fixed support and two fixed to the movable support, which bearing sets provide vertical support yet allow rotation of the movable support about the X and Y axes. Each pillow bearing preferably has a Teflon® sleeve so that it may take very high pressure.

The upper rod end axis must or at least should be reasonably well aligned with the axis of the support bearings in order to avoid cross-talk.

Placing the bearings so that they are a little off center helps keep some weight on the linear actuators (which could be electric or hydraulic) at all times. This eliminates or helps eliminate play between the lead screw and nut.

Pendulums

To form a level sensor, preferably a pendulum based sensor is used in accordance with another aspect of the invention. Leveling the movable support so that the UV tray is flat is very important for flow control in the preferred embodiment. The leveling system is not necessary for fixed installations.

Preferably the trailer on which the system is mounted has its own level control. However, the accuracy of that control is normally not sufficient for the desired level of flow control over the water in the UV tray, and so further level control is desired for the UV tray.

With reference to FIGS. 17, 17A and 17B, the leveling system as a whole includes pendulums 240. Each pendulum is formed by a cylindrical housing 242 filled with a damping fluid, e.g., perfluoroether 244, which is nonconductive, clear, and does not freeze or boil easily. The damping fluid keeps the pendulum's motion very smooth. The pendulum arm is mounted on a pin 248 which is fixed to the housing. A cylinder 250 rests on the pin with the pin extending through it, so that the pendulum arm can smoothly swing on the pin. (The pin is round but, could have an alternative cross section such as a triangle.) The top part 252 of the pendulum arm is fixed to the cylinder and the top part 252 has a column or tube 254, such as liquid crystal polymer, other plastic or metal extending down from it.

At the bottom of the pendulum arm is a plate 256 that swings in a channel of two blocks 258, 260. Block 258 contains a photo emitter (LED) 258a and a photodiode 258b pair that are optically aligned. Block 260 contains a like photo emitter and photodiode pair. The pendulum arm is initially aligned with one edge, e.g., edge 256a or edge 256b of the plate 256 at the optical axes (or just inside the optical axes) of the photo emitter and photodiode pairs, and the other photo emitter and photodiode pair (which is optional) is located preferably as close to the one pair at the edge as possible. The outputs of the photodiodes go to a level sensor 264, which in turn sends the output to a microprocessor 266 for then actuating the linear actuators 226, 228 to move the movable support 224 as needed to drive the pendulum arm back towards straight down. The arm may never actually settle in the straight down position, but the leveling system should be constructed to sufficient accuracy so that the UV tray will still always have substantially the same slight tilt. (The intent is that the linear actuators and therefore the arm never stop moving. It dithers around the vertical.) The blocks 258, 260 preferably sit in a round circuit board 267.

The detector pairs are thus placed so that when the pendulum is too far in one direction, both sense the plate at the bottom of the pendulum arm, and when too far in the other direction, both pairs do not sense anything (open). The microprocessor should then be set to control the actuators accordingly, to move relatively fast to drive the pendulum in the opposite direction, until only one pair is open and one pair detects the arm. At that point, the drive should stop or substantially stop. To set the initial position of the pendulum arm, a tool having a finger that fits into a hole 270 rear the top portion of the pendulum arm may be used.

The level sensor 264 could be essentially incorporated into the microprocessor 266 by connecting the photodiode outputs directly to the microprocessor, especially if the photodiode outputs simply provide an on or off output signal.

Reflectivity Meter

In accordance with another aspect of the invention, there is a reflectivity meter which may be used to measure the reflectivity of materials to light (or any electromagnetic radiation).

Figure 18A:
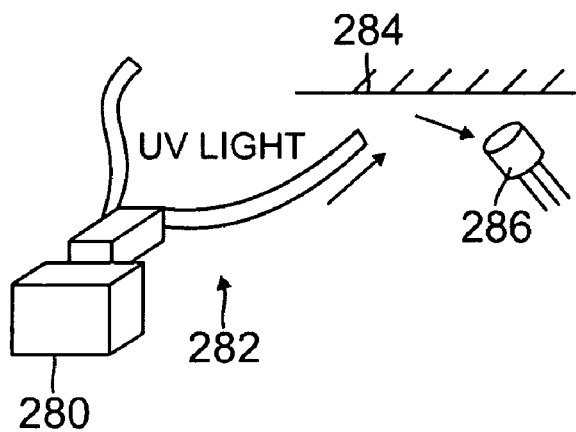
FIG. 18A is a schematic view of an optical path of the reflectivity meter of FIG. 18.

As shown in FIGS. 18 and 18A, the meter has a source such as a flash lamp 280 having a bifurcated fiber optic cable 282, and a test surface 284 may be placed on a table having a hole through which test surface 284 is accessed. The test surface 284 is thus in the optical path of light from one fork of the fiber optic cable. A photo detector-286 is positioned to receive reflections of the light from the test surface. The output of the photodetector 286 may then go to a capacitor and on to a microprocessor. The other fork of the fiber optic cable shines through a hole 283 to another photodetector 285 and may then go to a capacitor and on to a microprocessor. (One fiber-optic leg is the sample and the other is the reference.

The meter works as follows: a first surface aluminum mirror is placed over both optical paths. That provides the reference. Then the mirror is placed over one path and the sample is placed over the other. Then the outputs are compared.

Alternatively, the reference mirror could be checked and light level noted. Then the sample would replace it and light level compared. The alternative method is less expensive since it uses one photodetector and a single bundle fiber-optic.

For testing, photodetectors with band pass filters were used.

The microprocessor compares the levels of the light in the wavelength(s) of interest and determines the percentage of reflectivity of the test surface. (It could do this comparison.

One may also just look at raw intensity numbers for each leg and calculate reflectivity. To test for reflectivity of UV light, source 280 may be a UV light source, e.g., a xenon lamp or flash lamp, or may emit all wavelengths of light. In any event, a band pass filter or filters for the light of wavelength of interest, e.g., 254 nm may be used at the source output, at the fiber optic cable outputs, or at the input to the photo detectors. Using such a reflectivity meter, the inventor found that (Aluminized) Mylar® is highly reflective of 254 nm UV light, e.g., about 94%, and that the reflector of FIG. 10. (This refers to a different measurement. It was for the tube and reflector array.)

Illustrative Variations

The water treatment system as described above in the preferred embodiment has some redundancy to ensure drinkability of the resultant water. For example, the system can run with various filters, and the preferred embodiment has been run without the bag filters. It could also be run without the sand filters. In some circumstances it may not be necessary to have an intake end filter.

The system could be run using other filter media. The number of filters, porosity of the filters, and order of filtering could also be varied. Because the preferred embodiment is described in reference to fitting on a trailer, variations to obtain greater filtering capacity could be made. For example, the filters could be arranged to extend horizontally and mounted over the wheel wells. Such filters could be made about eight to ten feet long.

The type of filtering depends a lot on conditions. In early spring, water tends to be clearer (less algae and other reasons) while in late summer and fall the algae may be quite significant, making the water source look green. Under significant algae conditions, the intake filter becomes much more important.

A further option is to have a second trailer or truck with just filter media, and hook that truck's filters up to the intake hose first, then connect a hose from the first truck or trailer to a second truck or trailer having the further treatment stations, such as the ozone treatment and/or UV treatment, and/or chlorine tank.

The system can also run without the ozone treatment or without the UV treatment, although the UV treatment is preferred over the ozone treatment. UV treatment using 254 nm is believed to kill harmful organisms, by destroying the DNA of the microorganisms. This UV will also breakdown many harmful industrial chemicals. The UV, if done with the ozone, must be done separate from the ozone because the UV will break down the ozone.

The ozone is consumed by turbulence, body oils, fecal matter, heat, hard water, and other things contribute to ozone destruction. Good filtering therefore helps make the ozone treatment more effective.

The ozone treatment is useful in that it kills pathogens, reduces pesticides, herbicides and other industrial chemicals, and it improves the aesthetics of the water, i.e., it improves clarity and destroys odor. Given the portability of the treatment system, that limits the amount of power and space available to make ozone.

Because the ozone helps clarify the water, if the water is murky, ozone treatment is very useful. This is true not only because of the aesthetics of the resultant water, but also the clarity improves the effectiveness of the UV treatment, which follows the ozone treatment. UV light penetration throughout the water is important. If clarity is poor, the UV light may not achieve sufficient penetration. In the preferred embodiment, the depth of water is so small and the UV dose is so extreme, that turbidity can be tolerated.

The chlorine could be added on the fly to the resultant water rather than added in a tank. Chlorine is added because it provides a residual bactericide before the water is used.

Figure 19:
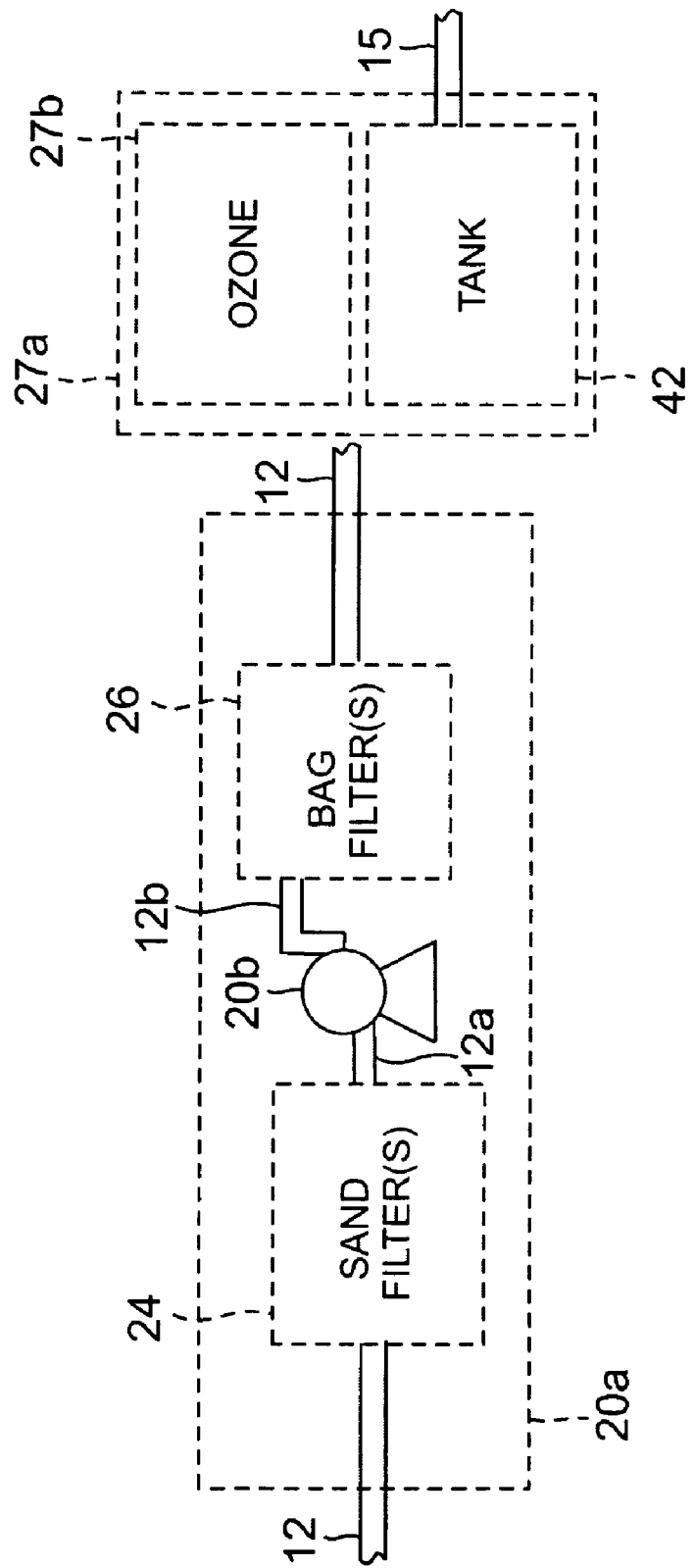
FIG. 19 is a variation of a portion of the system of FIG. 1.

The number and placement of pumps may be varied. Main input pump 8 for pumping water out of the source and through the filters, e.g., the sand filters, could be moved. In addition, a high pressure pump is preferably right before the ozone treatment tanks, i.e., after the bag filters, but it could be placed between the sand filters and bag filters. The pump 8 in FIG. 1 may also include a higher pressure pump before the filter section. As shown in the variation of FIG. 19, higher pressure pump 20b may be placed between the sand filter(s) and bag filter(s) instead of after or part of the input pump.

Further, if the truck or trailer containing the UV tray is stationary, any self-leveling device of the trailer or truck should be sufficient. However, if the truck or trailer sinks into mud or the like (which is quite possible given the weight especially with about 400 gallons of water on the truck), thereby rendering the self-leveling ineffective, then the leveling device of the invention becomes important. Leveling is critical to effective operation of the UV tray so water flows through the tray at a rate slow enough to provide the desired residence time for UV treatment, and fast enough to provide a reasonable overall throughput for the system.

Testing

Water treatment using a system in accordance with a preferred embodiment of the invention was performed on water withdrawn from a livestock pond (a pond frequented by livestock). Before using the system, the water tested positive for fecal coliform (*E. coli*) using the Colilert methodology. Fecal bacteria was present in the water.

After filtration using the inventive system, running without the ozone, the resultant water tested negative for *E. coli*.

The system as used for the test included the following:
An intake grating at the intake end of a hose;
Two sand filters made by Baker Hydro Filtration, Inc. of Augusta, Ga., 36" high pressure;
Bag filters provided by Filtration Systems.

An ozone treatment tank with nozzles as described herein having 2 tanks=100 Nozzles/Tank=200 total nozzles;
An ozonater made by Plasma Technics, Inc., model no. PLASMA BL03CK, size/output 10 lbs/Day; Turned off during the test.
A holding tank of 325 gallons, in which the ozonated water was held for three minutes transit time; Turned off during the test.
Two UV trays as described herein with twelve bulbs per tray, each bulb having 320 watts and putting out UV light including 254 nm wavelength light;
Water was flowed through the UV tray at 50 gallons per minute per tray times two trays;
After flowing through the UV trays, water was sent to a final holding tank of 75 gallons, where it received about 0.2 ppm chlorine treatment for less than one minute. The water flow rate through the system was about 90 to 100 gpm. The resultant water was what was tested. The water test bottles contain a compound that destroys chlorine so that the chlorine does not change the test results, i.e., upon reaching the bottle, the chlorine in the water does not kill any microorganisms. The compound is believed to be "hypo" sodium thiosulfate.

Additional Example

Surface Water Treatment
A pond with ducks in it was used as a water source, which was one of the worst that one may encounter. Prior to using the equipment and process of the invention, the water was cloudy green. That means that there was a lot of suspended material.

The system used to treat the water was as in FIG. 1, and included the following:
One set of two sand filters running in parallel.
One set of four bag filters running in parallel.
A spray tank of 325 gallon capacity was used but not filled to the top. Ozonation was off. The water came up to about the 250 gallon mark which is where the pump is set to turn on to send the water to the UV treatment section.
Each spray tank had 100 fog nozzles, and there were two tanks.
The system throughput was set at 100 gpm by having two 50 gallon per minute sections.
The two tanks are used to give the ozone approximately two minutes to interact with the water, but the ozone was off during the test.
The input water had the following characteristics:
A pond with ducks in it was used as a water source, which was one of the worst that one may encounter. Prior to using the equipment and process of the invention, the water was cloudy green. That means that there was a lot of suspended material. Specifically, the water had a turbidity of greater than 3 NTU (Nephelometric Turbidity Units). NTU is measured by shining a light through the water and looking for off axis scatter from the particles.

Results:
The first 500 gallons of water that came out was clear and had the following characteristics. Turbidity varied from 0.6 NTU to 1.6 NTU, even without the ozone treatment and/or more filters would further improve clarity. The water was cloudy but drinkable. The cloudiness was due to the fact that the input water was so bad that the bag filters clogged at about 500 gallons of throughput. The bag filters were removed at that point and the system operated without them.
The sand filters made sure that the nozzles did not clog.

Although the invention has been described using specific terms, devices, and/or methods, such description is for illustrative purposes of the preferred embodiment(s) only.

Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

What is claimed is:

1. A water treatment system, comprising:
   a UV treatment section for applying UV light to the water, wherein the UV treatment section comprises a tray for flow of water in a first direction from an input end to an output end, the tray having sides extending in the first direction, and wherein there are a plurality of elongate UV lights are disposed above a water receiving portion of the tray and extending in a second direction transverse to the first direction across the tray so as to extend to proximate the sides; and
   a plurality of plates, each plate being disposed in the second direction in the tray and centered below a corresponding one of the UV lights, and each plate having a plurality of perforations there across, wherein the perforations are configured to create turbulent flow to slow flow at the perforations at locations in the tray closest to each of the UV lights where light from the UV lights is at its strongest, the plates extending across the tray to the sides.

2. The water treatment system of claim 1, wherein the plurality of plates and the plurality of UV lights are the same, and each plate is aligned with a corresponding UV light such that each plate is disposed in a plane that intersects the corresponding UV light.

3. The water treatment system of claim 1, wherein the UV treatment section is mounted to a leveling system comprising at least two actuators, the UV treatment section being movable by the at least two actuators.

4. The water treatment system of claim 3, wherein the at least two actuators are controlled by a microprocessor.

5. The water treatment system of claim 3, wherein the leveling system further comprises a fixed frame and a movable frame, the fixed frame having one actuator of the two actuators midway along one side thereof and fixed thereto, and another actuator of the two actuators being located midway along another side thereof and fixed thereto, and the actuators also being gimbaled at an upper end thereof to the movable frame, and bearings disposed along an intersection of axes of the gimbaled portion of the actuators to the movable frame and the bearings, the UV station being mounted on the movable frame.

6. The water treatment system of claim 5, wherein the leveling system includes a level detection mechanism comprising pendulums, each pendulum comprising a housing, a damping fluid therein, a pendulum arm for swinging freely within the housing, and detectors for detecting a position of a bottom portion of the pendulum.

7. The water treatment system of claim 3, wherein each of the at least two actuators is disposed at a midpoint of a side of the UV treatment section.

8. The water treatment system of claim 1, wherein there is an input pump for pumping water from a source through the system; a filter section receiving water from the input pump; and an ozone treatment section between the filter section and the UV treatment section for applying ozone to the water.

9. The water treatment system of claim 1, wherein the input pump, filter section and UV treatment section are mounted on a supporting structure, and further comprising a generator mounted on the supporting structure.

10. The water treatment system of claim 1, wherein there is an ozone treatment section prior to the UV treatment section, and the ozone treatment section comprises a tank having nozzles for atomizing water, and a source of ozone, wherein the source of ozone is connected with the tank, whereby the atomized water is mixed with the ozone within the tank.

11. The water treatment system of claim 1, wherein reflectors are positioned at each UV light for reflecting UV light towards the water, the reflectors each comprising a plastic sheet with a reflective surface.

12. The water treatment system of claim 1, wherein reflectors are positioned at each UV light for reflecting UV light towards the water, the reflectors each comprising a first substrate having a thin layer of biaxially-oriented polyethylene terephthalate (boPet) bonded thereto, and the thin layer having a further layer of aluminum bonded thereon to provide a reflective surface, and the reflective surface having a silicone coating thereon.

13. The water treatment system of claim 1, wherein the leveling system includes a movable frame and each of the at least two actuators is a linear actuator, and wherein the movable frame is supported on bearings located at a center of mass thereof, and an upper end of each linear actuator is positioned to align with an axis of a respective one of the bearings.

14. The water treatment system of claim 1, wherein the UV lights comprise elongated UV bulbs, and the UV tray further comprises multiple elongate baffles, wherein each of the baffles is perforated, and wherein each of the UV bulbs are disposed above and in line with each of the baffles, respectively, and each of the UV bulbs and baffles extend in a direction transverse to a direction of water flow through the tray.

15. The water treatment system of claim 1, wherein the system comprises an ozone treatment section, and the ozone treatment section contains nozzles for atomizing the water for mixing with the ozone, and the UV treatment section is downstream of the ozone treatment section.

16. The water treatment system of claim 15, wherein the ozone treatment section comprises a first tank, and the nozzles are contained within the tank, and there is a second tank located below the first tank for receiving ozone treated water to increase ozone water contact time.

17. The water treatment system of claim 1, further comprising:
   an input pump for pumping water from a source through the system; and
   a filter section receiving water from the input pump.

18. The water treatment system of claim 1, further comprising:
   an ozone treatment section having a spray nozzle for atomizing water, and having a source of ozone for mixing with the water, each nozzle comprising a nozzle body and a nozzle insert, the nozzle body being formed with a chamber, and the nozzle insert being configured to be disposed within the chamber and being formed with an angled channel to cause fluid that passes through the angled channel into the chamber to swirl.

19. The water treatment system of claim 1, wherein the perforations comprise between 35% and 75% of the surface area of each plate.

20. The water treatment system of claim 1, wherein the perforations comprise approximately 50% of the surface area of each plate.

21. The water treatment system of claim 1, wherein each plate is less than 0.030 inches thick.

22. The water treatment system of claim 1, wherein each plate is configured to equalize the velocity gradient in the flow such that a difference in speed between surface-adjacent fluid and surface-remote fluid is reduced.

23. A water treatment system, comprising:
a UV treatment station for applying UV light to the water, wherein the UV treatment station comprises a leveling system, a tray for flow of water from an input end to an output end, baffles, and UV lights, and
wherein the leveling system includes a level detection mechanism comprising pendulums, each pendulum comprising a housing, a damping fluid therein, a pendulum arm for swinging freely within the housing, and detectors for detecting a position of a bottom portion of the pendulum.

24. A water treatment system, comprising: an ozone treatment section for receiving water and contacting the water with ozone, the ozone treatment section comprising a chamber containing spray nozzles for atomizing the water, and means for supplying ozone into the chamber for contacting with the water that has been atomized,
wherein each nozzle comprises a nozzle body and a nozzle insert, the nozzle body being formed with a chamber, and the nozzle insert being configured to be disposed within the chamber and being formed with an angled channel to cause fluid that passes through the angled channel into the chamber to swirl.

25. The water treatment system of claim 24, further comprising:
means for supplying water; and
wherein the chamber comprises a first tank containing the nozzles, and the ozone treatment section further comprises a second tank located below the first tank for receiving the ozone treated water from the first tank to increase ozone water contact time.

26. The water treatment system of claim 24, wherein the means for swirling the water inside each nozzle comprises a bore formed by each nozzle, the bore being less than 0.014 inches long to maintain swirling of water in each nozzle.

27. The water treatment system of claim 24, wherein the means for swirling the water inside each nozzle comprises a bore formed by each nozzle, the bore being between 0.008 and 0.014 inches long to maintain swirling of water in each nozzle.

28. The water treatment system of claim 24, wherein each nozzle comprises a nozzle body and an opening for spraying out the water, and having means for swirling the water inside each nozzle.

29. The water treatment system of claim 28, wherein the means for swirling the water inside each nozzle comprises a bore formed by each nozzle, the bore being between 0.010 and 0.012 inches long to maintain swirling of water in each nozzle.

30. The water treatment system of claim 28, wherein the ozone treatment section comprises at least one hundred nozzles.

31. The water treatment system of claim 28, wherein the means for swirling the water inside each nozzle comprises a nozzle opening with a knife edge.

32. The water treatment system of claim 31, wherein the knife edge of each nozzle opening is less than 0.052 inches to increase dispersal of the spray outside each nozzle.

33. The water treatment system of claim 31, wherein the knife edge of each nozzle opening is less than 0.012 inches to increase dispersal of the spray outside each nozzle.

34. The water treatment system of claim 28, wherein each nozzle has means for swirling the water inside each nozzle and limiting the dispersal of the spray to four inches beyond each nozzle exit.

35. The water treatment system of claim 24, wherein the ozone treatment section comprises multiple pipes therein for carrying water, and there is a plurality of the multiple spray nozzles connected to each pipe for atomizing the water inside the tank, and the ozone treatment section further comprising a source of ozone for mixing with the atomized water inside the tank, each of the spray nozzles comprising a nozzle body and a nozzle insert, the nozzle body being formed with a chamber, and the nozzle insert being configured to be disposed within the chamber and being formed with an angled channel to cause fluid that passes through the angled channel into the chamber to swirl whereby the nozzles spray the water in a fine mist.

36. A method of treating water using a mobile treatment facility having filters, pumps, hoses, a UV treatment station and an ozone treatment station, wherein the method comprises the steps of:
mounting the filters, pumps, hoses, a UV treatment station and an ozone treatment station on a trailer;
transporting the trailer to a source of water needing treatment;
a step of filtering water from the source; and
a step of flowing the water through the UV treatment station, treating the water with UV light from UV lamps by illuminating turbulent water flow generated by perforations in plates disposed directly below and aligned with a corresponding one of the UV lamps,
wherein the UV treatment section comprises a tray for flow of water in a first direction from an input end to an output end, the tray having sides extending in the first direction, and wherein there are a plurality of elongate UV lights are disposed above a water receiving portion of the tray and extending in a second direction transverse to the first direction across the tray so as to extend to proximate the sides, and
wherein the step of flowing comprises flowing the water through the perforations in the plates to create the turbulent water flow proximate the perforations at the same time as performing the step of treating the water with UV light.

37. The method of claim 36, wherein the UV treatment section includes a tray, the method further comprising
adjusting an inclination of the tray in the UV treatment section using a leveling system on which the UV treatment section is mounted and comprising at least two actuators.

* * * * *